(12) United States Patent
Meyer et al.

(10) Patent No.: US 11,358,198 B2
(45) Date of Patent: Jun. 14, 2022

(54) METHOD FOR PRODUCING SPRING STRUT FORKS

(71) Applicant: BENTELER AUTOMOBILTECHNIK GMBH, Paderborn (DE)

(72) Inventors: Stephan Meyer, Bielefeld (DE); Frode Paulsen, Gjoevik (NO)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 227 days.

(21) Appl. No.: 16/713,152

(22) Filed: Dec. 13, 2019

(65) Prior Publication Data
US 2020/0188977 A1 Jun. 18, 2020

(30) Foreign Application Priority Data
Dec. 14, 2018 (DE) ...................... 10 2018 132 315.8

(51) Int. Cl.
*B21C 23/00* (2006.01)
*B60G 13/00* (2006.01)
*B21C 23/14* (2006.01)

(52) U.S. Cl.
CPC .......... *B21C 23/142* (2013.01); *B21C 23/002* (2013.01); *B60G 13/005* (2013.01);
(Continued)

(58) Field of Classification Search
CPC ............... B21C 23/142; B21C 23/002; B60G 2204/129; B60G 2206/7102;
(Continued)

(56) References Cited

U.S. PATENT DOCUMENTS 3,030,698 A * 4/1962 Pissarevsky ............ B23P 13/04
29/896.3
5,899,398 A 5/1999 Henriksson et al.
(Continued)

FOREIGN PATENT DOCUMENTS

CN 111112363 A * 5/2020
DE 102017206861 A1 10/2018
(Continued)

OTHER PUBLICATIONS

European Search Report and Written Opinion for European Application No. 19214913.6 dated Apr. 28, 2020; 14pp.
(Continued)

*Primary Examiner* — James A English
*Assistant Examiner* — Matthew D Lee
(74) *Attorney, Agent, or Firm* — Hauptman Ham, LLP

(57) ABSTRACT

An efficient method for producing spring strut forks for motor vehicles is presented. In each case two spring strut forks are produced from a metallic extruded profile as a starting product. The extruded profile has a central, middle main chamber and four longitudinal chambers which are arranged offset with respect to one another over the circumference of the main chamber. Wall portions of the main chamber which are situated between the longitudinal chambers are removed, and the extruded profile is severed into two semifinished parts. Each semifinished part has one cylinder portion and two oppositely situated arm portions which project relative to the cylinder portions. The semifinished parts are subsequently mechanically machined, and one spring strut fork is produced from each semifinished part.

10 Claims, 2 Drawing Sheets

(52) U.S. Cl.
CPC .............. *B60G 2204/129* (2013.01); *B60G 2206/7102* (2013.01); *B60G 2206/8105* (2013.01)

(58) Field of Classification Search
CPC .......... B60G 2206/8105; B60G 13/005; B60G 7/001; B23P 2700/14; B23P 13/04
See application file for complete search history.

(56) References Cited

U.S. PATENT DOCUMENTS

2001/0030222 A1* 10/2001 Konno .................... B23P 15/00
228/112.1
2021/0229224 A1* 7/2021 Paulsen ................ B60G 13/005

FOREIGN PATENT DOCUMENTS

| | | |
|---|---|---|
| DE | 102017209679 A1 | 12/2018 |
| DE | 102017212482 A1 | 1/2019 |
| DE | 102017010860 A1 | 5/2019 |
| EP | 0349002 A1 | 1/1990 |
| JP | H05161913 A | 6/1993 |
| JP | H05161914 A | 6/1993 |
| WO | 2019101881 A2 | 5/2019 |

OTHER PUBLICATIONS

Office Action for German Application No. 10 2018 132 315.8 dated Nov. 13, 2019; 10pp.

* cited by examiner

METHOD FOR PRODUCING SPRING STRUT FORKS

RELATED APPLICATIONS

The present application claims priority to German Application Number 10 2018 132 315.8 filed Dec. 14, 2018, the disclosure of which is hereby incorporated by reference herein in its entirety.

The invention relates to a method for producing spring strut forks for motor vehicles.

A spring strut fork is a constituent part of a wheel suspension of a motor vehicle. A spring strut fork of the type in question has a spring strut receptacle for receiving and supporting a spring strut and has two fork arms with attachment points for the articulation of the spring strut fork on a suspension component, for example of a chassis link.

A method for producing a spring strut fork belongs to the prior art in DE 10 2017 206 861 A1. The spring strut receptacle has a spring strut receptacle and fork arms which extend away from said spring strut receptacle and which serve for engaging around a chassis link and for articulation on the latter. The spring strut fork is produced from a light metal extruded profile as a semifinished part by cutting and deformation. The light metal extruded profile has a middle main chamber and has two lateral longitudinal chambers situated diametrically opposite one another in relation thereto. By cutting into one end of the main chamber, two bearing arms are formed from the longitudinal chambers, which bearing arms are in turn formed into the spring strut fork by deforming bending and formation of attachment receptacles.

The method is innovative and permits the production of spring strut forks which are advantageous from a weight aspect and which have high stability.

Proceeding from the prior art, the invention is based on the object of making a method for producing spring strut forks more economical and increasing the efficiency thereof.

A spring strut fork has a spring strut receptacle and two fork arms. For the production process, a metallic extruded profile is provided which has a central, middle main chamber and at least four longitudinal chambers. The longitudinal chambers are arranged offset with respect to one another over the circumference of the main chamber. Two longitudinal chambers are situated opposite one another on the circumference of the main chamber.

In practice, it is preferable for four longitudinal chambers to be provided. It is also possible for the extruded profile to have more than four longitudinal chambers.

The extruded profile may have different wall thicknesses. Preferably, the longitudinal chambers have a different wall thickness than the middle main chamber. In particular, the wall thickness of the main chamber is greater than the wall thickness of the longitudinal chambers, measured in each case in cross section.

The extruded profile is preferably composed of light metal, in particular of aluminum or of an aluminum alloy. Aluminum alloys from the 6000 series are considered particularly suitable. Hardenable aluminum alloys, in particular aluminum-magnesium-silicon alloys (AlMgSi), are particularly preferable. Hardenable aluminum alloys become stronger and harder through heat treatment. One aspect of the invention provides for the extruded profiles (starting profiles), the semifinished parts or the spring strut forks to be entirely or partially heat-treated. By means of the heat treatment, the strength and the fracture toughness are set in the spring strut forks in targeted fashion. It is furthermore possible for the extruded profiles or the semifinished parts to be heated in order to facilitate the machining. Here, they may be immediately subsequently quenched, whereby separate subsequent heat treatment can be omitted. A targeted retroactive heat treatment is self-evidently also possible in order to provide the spring strut forks with the desired strength and fracture toughness characteristics.

One advantageous aspect of the invention provides for the longitudinal chambers to be arranged offset with respect to one another by 90° +/− 15° on a pitch circle. In particular, four longitudinal chambers are arranged at right angles with respect to one another. The longitudinal chambers are then offset with respect to one another by 90° on a pitch circle, such that in each case two longitudinal chambers are situated diametrically opposite one another.

Wall portions of the main chamber that are situated between the longitudinal chambers are removed from the provided extruded profile. This is performed in a middle length portion of the extruded profile. Furthermore, the extruded profile is severed into two semifinished parts, such that each semifinished part has a cylinder portion and two arm portions which are situated opposite one another and which project relative to the cylinder portion.

One advantageous aspect of the invention provides for in each case two identical semifinished parts to be produced from the extruded profile. The semifinished parts are manufactured from the extruded profile in an identical but opposite manner, that is to say in an identical but mirror-inverted manner. In each case one end portion of the starting profile, that is to say of the extruded profile, forms the cylinder portion. In each case two longitudinal chambers form two arm portions which project relative to the cylinder portion. Each semifinished part then has a cylinder portion with two relatively long arm portions, which project relative to the cylinder portion, and two truncated longitudinal chambers. The truncated longitudinal chambers have a length which corresponds to the length of the cylinder portion.

Subsequently, in each case one spring strut fork is formed by mechanical machining of the semifinished parts. The mechanical machining provides in particular cutting and deformation operations. The cylinder portion of a semifinished part forms the spring strut receptacle. The fork arms of the spring strut fork are produced from the arm portions of a semifinished part.

During the mechanical machining of the semifinished parts, provision is advantageously made whereby the cylinder portions are provided with a longitudinal slot.

In particular, the longitudinal cut is made along a truncated longitudinal chamber.

The longitudinal cut facilitates the installation of a spring strut and improves the fastening thereof. By means of the longitudinal slot, the spring strut receptacle can be spread open during the installation of the spring strut, and the spring strut can be inserted into the spring strut receptacle. Subsequently, the spring strut receptacle is reduced in diameter radially by virtue of the longitudinal slot being pressed together, and the spring strut is securely fixed in the spring strut receptacle.

During the mechanical machining of the semifinished parts, the arm portions are bent and are shaped to form in each case one fork arm. Here, the arm portions are, in a longitudinal direction, firstly bent outward and are bent back again at the ends, such that they have an arcuate profile. At the ends, the arm portions are flattened, and the flattened end portions are provided with attachment points. In particular, the attachment points are bearing seats produced by shear cutting techniques, in particular by stamping, or a punched hole arrangement. During the mechanical machining of the semifinished parts, the attachment points are aligned parallel relative to one another, such that the central points thereof lie on a common axis.

The invention will be described in more detail below on the basis of drawings, in which, in each case in a perspective view.

Figure 4:
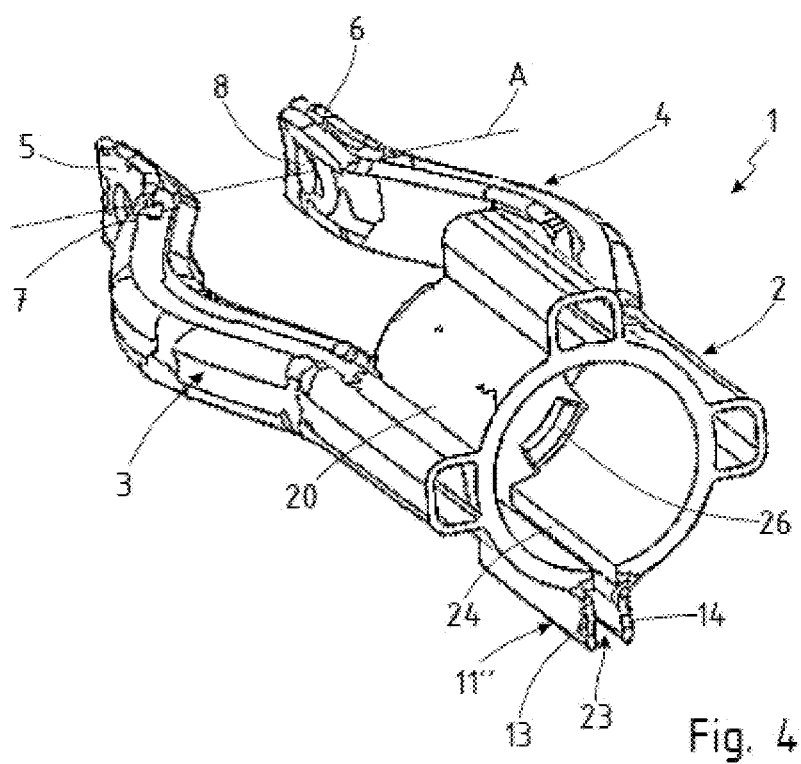
FIG. 4 shows a spring strut fork produced in accordance with the invention.

FIG. 4 shows a spring strut fork 1. The spring strut fork 1 has a spring strut receptacle 2 and two fork arms 3, 4 extending away from the spring strut receptacle 2 at one side. The fork arms 3, 4 run in arcuately curved fashion and are flattened at the ends. The flattened end portions 5, 6 are aligned parallel to one another and are provided with attachment points 7, 8. The attachment points 7, 8 are in each case bearing seats produced by means of a punched hole arrangement in the end portions 5, 6. The attachment points 7, 8 have a common axis A directed transversely with respect to the longitudinal extent of the spring strut fork 1.

The spring strut fork 1 is composed of light metal, in particular of aluminum or of an aluminum alloy, and is produced from an extruded profile 9.

Figure 1:
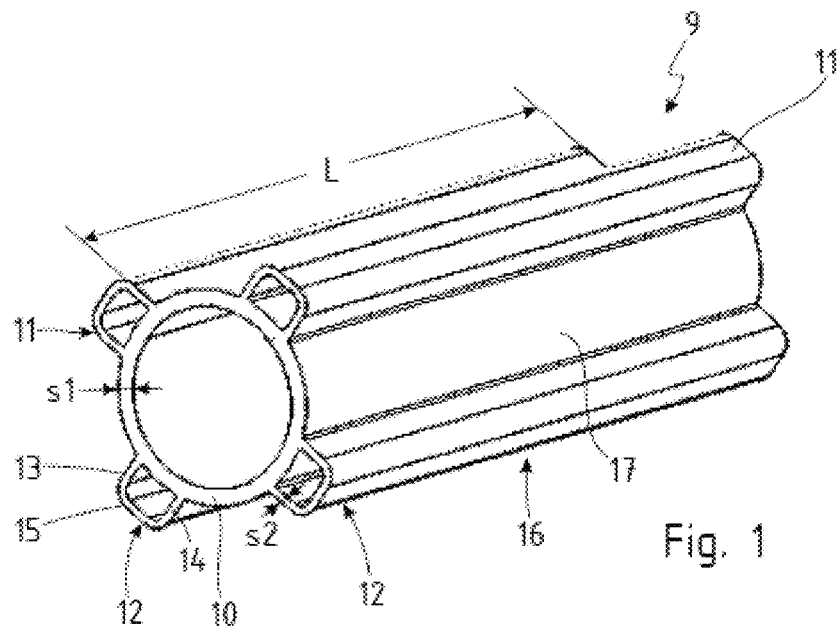
FIG. 1 shows an extruded profile as a starting product for the production of spring strut forks.
Figure 2:
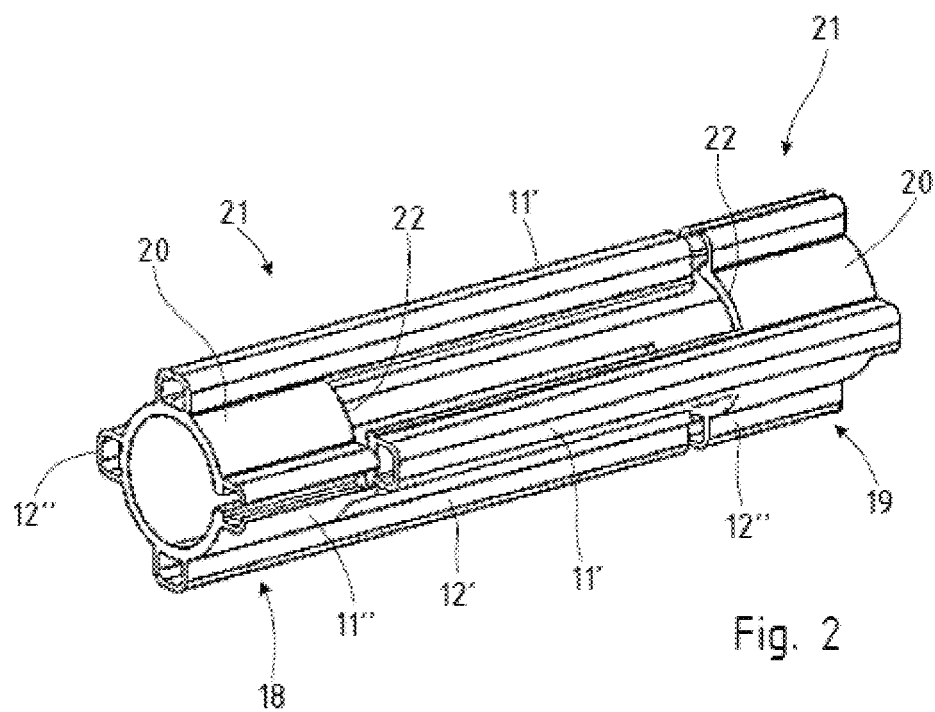
FIG. 2 shows the extruded profile in an intermediate stage of the machining.

An extruded profile 9 that is used as a starting product for the production of in each case two spring forks 1 is illustrated in FIG. 1.

The extruded profile 1 has a central, middle main chamber 10. The main chamber 10 is of cylindrical configuration. On the outside, four longitudinal chambers 11, 12 are arranged offset with respect to one another over the circumference. The four longitudinal chambers 11, 12 have, in cross section, an approximately U-shaped contour with in each case two longitudinal webs 13, 14 and a rear wall 15 which connects the longitudinal webs 13, 14. The longitudinal chambers 13, 14 extend over the entire length L of the main chamber 10.

The main chamber 10 of the extruded profile 9 has a wall thickness s1. Said wall thickness s1 of the main chamber 10 is greater than the wall thickness s2 of a longitudinal chamber 11 or 12. The wall thickness s1 of the main chamber 10 and the wall thickness s2 of the longitudinal chambers 11, 12 consequently differ from one another.

To produce the spring strut forks 1, wall portions 17 of the main chamber 10 which are situated between the longitudinal chambers 11, 12 in a middle region 16 of the extruded profile 9 are removed along the longitudinal chambers 11, 12. Cylinder portions 20 remain at the two ends 18, 19 of the extruded profile 9. Subsequently, the extruded profile 9 is severed into two semifinished parts 21. For this purpose, in each case two opposite longitudinal chambers 11, 12 are severed directly behind or parallel to the inner edge 22 of a cylinder portion 20, on the one hand at the end 18, and at the other end 19.

Figure 3:
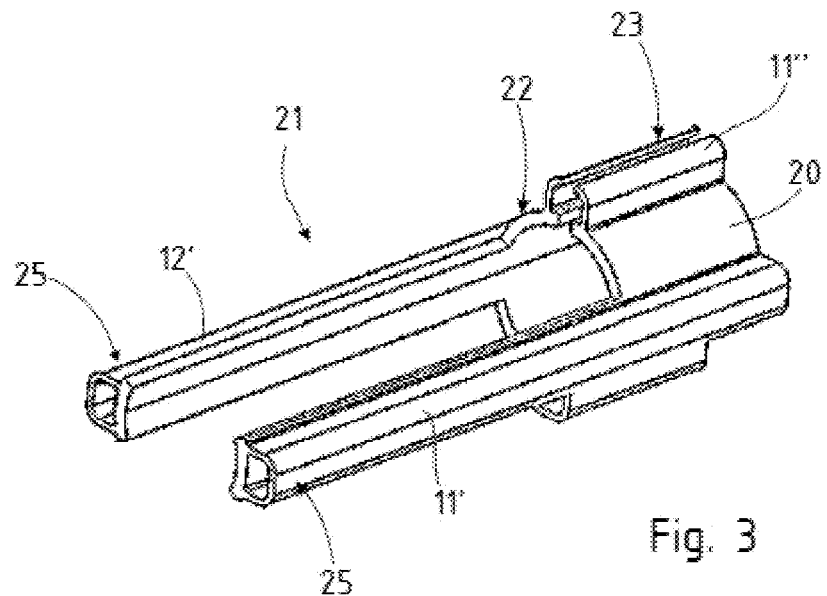
FIG. 3 shows a semifinished part produced from the extruded profile.

In this way, two identical semifinished parts 21 are created, one of which is illustrated in FIG. 3. The semifinished part 21 has the cylinder portion 20 and two arm portions 11', 12' which are formed from the longitudinal chambers 11, 12, are situated opposite one another and project relative to the cylinder portion 20. Of the longitudinal chambers 11, 12 that previously ran so as to be offset in each case by 90°, the truncated longitudinal chambers 11", 12" have remained on the cylinder portion 20.

During the mechanical machining of the semifinished parts 21, the cylinder portions 20 have each been provided with a longitudinal slot 23. The longitudinal slot 23 extends through one of the truncated longitudinal chambers 11" and severs the wall 24 of the cylinder portion 20 and the rear wall 15 of the longitudinal chamber 11.

Then, a spring strut fork 1 is produced from each semifinished part 21 by mechanical machining. During the mechanical machining, the fork arms 3, 4 are produced. For this purpose, the arm portions 11', 12' are bent outward and are directed inward again at the ends, and the free ends 25 thereof are flattened and are provided with the attachment points 7, 8 in the flattened end portions 5, 6. In this way, the bearing seats are formed in the end portions 5, 6 of the fork arms 3, 4, as illustrated in FIG. 4. Each fork arm 3, 4 extends from the outer end side of the spring strut receptacle 2 along the cylinder portion 20 and projects relative to the cylinder portion 20.

At the inner end of the cylinder portion 20 at the fork arm side, said cylinder portion has a projection 26. The projection 26 has been formed out of the cylinder portion 20 and has been deformed in an inwardly directed manner. The projection 26 forms a mechanical end stop for the damper installation. This is intended to prevent the damper tube from sliding further during the installation process until the damper tube has been firmly clamped and the damper is held by a clamping force applied to the webs 13, 14 of the longitudinal chamber 11" provided with the longitudinal cut 23.

The invention claimed is:

1. Method for producing spring strut forks for motor vehicles, wherein a spring strut fork has a spring strut receptacle and fork arms and is produced from a metallic extruded profile which has a central, middle main chamber and longitudinal chambers on an outside of the extruded profile, the method comprising:
   providing an extruded profile having at least four longitudinal chambers which are arranged offset with respect to one another over the circumference of the main chamber;
   removing wall portions of the main chamber which are situated between the longitudinal chambers, and severing the extruded profile into two semifinished parts which have in each case one cylinder portion and two oppositely situated arm portions which project relative to the cylinder portion; and
   mechanically machining the semifinished parts to form in each case one spring strut fork.

2. Method according to claim 1, wherein two identical semifinished parts are produced from the extruded profile.

3. Method according to claim 1, wherein the longitudinal chambers are arranged offset with respect to one another by 90° +/−15° on a pitch circle.

4. Method according to claim 1, wherein, during the mechanical machining of the semifinished parts, the cylinder portions are provided with a longitudinal slot.

5. Method according to claim 4, wherein the longitudinal slot is made along a truncated longitudinal chamber.

6. Method according to claim 1, wherein, during the mechanical machining of the semifinished parts, the arm portions are bent, flattened at the ends, and provided with attachment points in the flattened end portion.

7. Method according to claim 6, wherein, during the mechanical machining of the semifinished parts, the attachment points are aligned parallel to one another.

8. Method according to claim 1, wherein the extruded profile comprises aluminum or an aluminum alloy.

9. Method according to claim 1, wherein a wall thickness of the main chamber and a wall thickness of the longitudinal chambers differ from one another.

10. Method according to claim 9, wherein the wall thickness of the main chamber is greater than the wall thickness of a longitudinal chamber.

\* \* \* \* \*